Dec. 5, 1939.        B. LEE        2,182,025
TWO-SPEED COASTER BRAKE
Filed April 18, 1938        2 Sheets-Sheet 1

INVENTOR.
BERT LEE
BY
Kwis Hudson & Kent
ATTORNEYS

Dec. 5, 1939.   B. LEE   2,182,025
TWO-SPEED COASTER BRAKE
Filed April 18, 1938   2 Sheets-Sheet 2

INVENTOR.
BERT LEE
BY Kwis Hudson & Kent
ATTORNEYS

Patented Dec. 5, 1939

2,182,025

UNITED STATES PATENT OFFICE 2,182,025

TWO-SPEED COASTER BRAKE

Bert Lee, Sacramento, Calif., assignor to Alvin J. Musselman, Cleveland Heights, Ohio Application April 18, 1938, Serial No. 202,607

5 Claims. (Cl. 74—290)

This invention relates to improvements in two-speed coaster brakes, and particularly to conversion units for coaster brakes so constructed that they are adapted to be substituted for the single speed drives conventionally employed in coaster brakes, in order that a coaster brake of ordinary design and construction may be converted quickly and easily from single speed drive to two-speed drive or vice versa. The present application is a continuation in part of my prior application Serial No. 98,285, filed August 28, 1936. Numerous patents have been issued on epicyclic or planetary gears for bicycles, and drives embodying such gears have been in use to some extent for many years, but in all cases where they were employed in the hub of the rear or driving wheel of the bicycle, they have been built into that hub and have been furnished by the manufacturer only as a complete hub mechanism. Hence, if the manufacturer desired to supply both single and two-speed hubs he was faced with the production problem and consequent expense of turning out two complete articles. Furthermore, the expense of converting a single speed bicycle into one having two speeds was so great that it was seldom attempted.

In accordance with the present invention the two-speed drive is constructed as a unit which forms a part only of a conventional coaster brake, and is interchangeable with a portion of the conventional coaster brake embodying a single speed drive therefor. The hub, the braking mechanism, and the clutch which engages alternately either the braking mechanism or the hub remains the same. The manufacturer of single speed coaster brakes, in order to supply two-speed coaster brakes as well, needs to manufacture additionally the two-speed driving unit only. The bicycle manufacturer can turn out rear wheels with coaster brake hubs incorporated therein all uniform in construction, and can fill orders for single or two-speed models by merely inserting into the hubs of the rear wheels either the single speed or the two-speed drive units as his order may require. Furthermore, the bicycle dealer may convert bicycles in his stock from single speed to two-speed or vice versa readily and quickly to meet the demands of the purchaser and without carrying a double stock of bicycles, while the user of a bicycle may purchase a conversion unit and make the substitution himself at relatively small expense. The importance of these advantages is obvious.

One of the objects of the invention therefore is the provision of a two-speed driving unit which may be readily and quickly substituted for a single speed driving unit in a conventional coaster brake.

Another object of the invention is the provision of a two-speed planetary gearing so designed and constructed as to be particularly adapted for use in a conversion unit of the kind described.

Other objects and features of novelty will appear as I proceed with the description of that embodiment of the invention which, for the purposes of the present application, I have illustrated in the accompanying drawings, in which Fig. 1 is a rear view, partly in section, of a coaster brake equipped with my conversion two-speed unit, the planetary gear elements being shown locked together for high speed drive.

Similar reference characters refer to like parts throughout the views.

Figure 1:
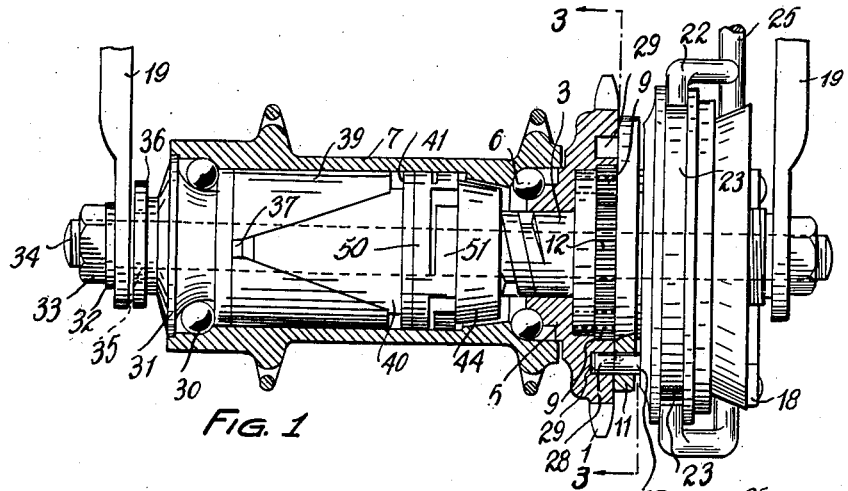
Figure 2:
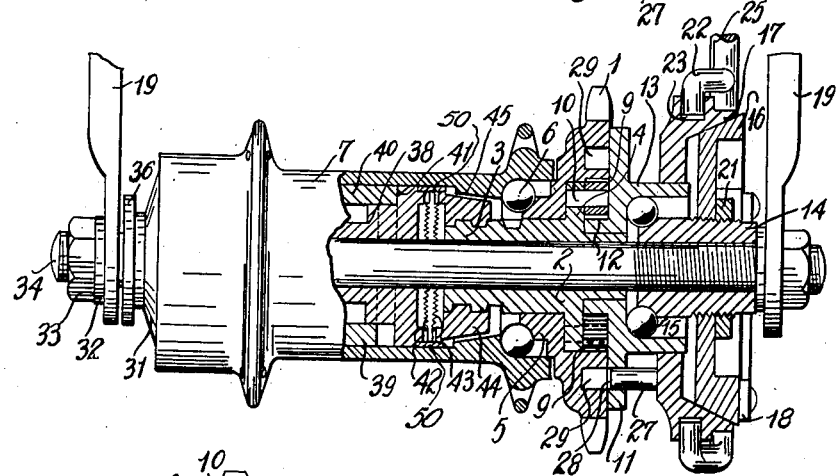
Fig. 2 is a similar view with the gearing set for low speed drive, that is through the planetary system.
Figure 3:
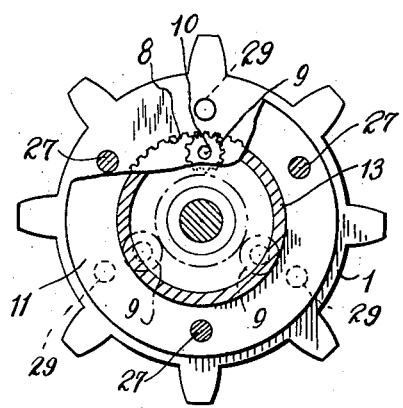
Fig. 3 is a detail view partly in cross section on the line 3—3 of Fig. 1.

Referring now more particularly to those figures of the drawings which illustrate my coaster brake as equipped with a two-speed driving unit, I have shown at 1 a driving sprocket having an inwardly offset hub portion which is rotatably mounted on a sleeve 2 formed as an extension of the usual coaster brake driver screw 3. This driver screw has a rotative bearing on the rear axle of the bicycle, and is also longitudinally movable to a slight extent for adjustment purposes. An annular flange 4 projects outwardly from the sleeve 2 and fits into a correspondingly shaped recess in the hub portion of sprocket 1. The inner side of the sprocket is formed with a ball race 5 for the reception of ball bearings 6 which run in an internal race in the hub 7 of the rear bicycle wheel.

The sprocket 1 is formed with an internal gear 8 which meshes with a plurality of circumferentially spaced pinions 9 journaled on stub shafts 10 which project laterally from flange 4. 12 is a sun gear rotatably mounted at the outer end of sleeve 2 which meshes with planet pinions 9. The sun gear is provided with a radially extending flange 11, from which there extends laterally and outwardly a cylindrical flange or cup 13, the inner portion of which forms in connection with the inner end of the usual spindle bearing or cone 14 a raceway for bearing balls 15. When the cone 14 is threaded inwardly or outwardly on the axle the bearing 15 is adjusted, and the whole two-speed unit including the driver screw 3 may be shifted thereby in an axial direction to a greater or lesser extent, controlling the adjustment of the ball bearing 6.

Rotation of the sun gear 12 and its integral flange 11 is controlled by means of a brake assembly comprising a fixed member 16 with a conical braking surface, said member being adjustably threaded but normally non-movable on spindle bearing 14, and a cooperating shift member 17 slidably mounted on the cup 13. Rotation of the member 16 is prevented by means of an arm 18 secured at one end to said member 16 and at the other end to the bicycle frame 19 by suitable clamping means 20. The cooperating faces of the brake members 16 and 17 are arranged so that they will be in frictional engagement when member 17 is moved outward, and in order to regulate the braking effect the member 16, after being disconnected from arm 18, may be threaded in or out of the spindle bearing 14. 21 is a lock nut which acts also as a reinforcement to assist in taking the load imposed upon brake element 16.

The sliding movement of the brake member 17 along cup 13 is accomplished by means of a shifter fork 22 the ends of which engage in a circumferential groove 23 in member 17. This shifter fork is supported in a bearing 24 secured to arm 18. A rod 25, having a handle 26 on its upper end, extends from the fork up the adjacent frame member of the bicycle to a termination near the seat thereof, and affords a readily accessible control for the device.

The movable member 17 is provided with a plurality of inwardly projecting pins 27 which extend slidably through matching openings 28 in flange 11 and, when the member 17 is moved to an inward or released position, these pins extend into matching sockets 29 in the outer face of sprocket 1, thus locking together the sprocket 1 with its internal gear 8 and the flange 11 with its sun gear 12.

In order that the application of the two-speed unit and its ready substitution for the ordinary sprocket and driver screw unit may be thoroughly understood, I will describe briefly that form of coaster brake which I have shown herein by way of example, it being understood that the invention is applicable to any other style of coaster brake utilizing the conventional driver screw.

As previously stated, the hub 7 is mounted at one end upon the ball bearing 6. At its other end it is mounted upon a ball bearing 30, the outer race of which is formed in the hub itself while the inner race consists of a cone 31 which is backed by a rear fork of the frame 19 and by the washer and nut 32 and 33 respectively, all of these parts being supported upon the axle 34 which is threaded to receive the nut 33. The cone 31 has a polygonal extension 35 which fits into a correspondingly shaped opening in a brace 36 which has the usual arm running forward along the frame and secured thereto, by means of which the cone 31 is prevented from turning. On the other side this cone has an inward radially arranged rib 37. Inwardly of the cone 31 there is mounted on the axle a spool 38 having a socket to receive the rib 37, so that this spool also is held against rotation. Surrounding spool 38 there is a resilient brake sleeve 39, preferably made of brass, which is split and formed with inclined edges, as shown in Fig. 1. The edges of the split also abut against rib 37 for the purpose of preventing rotation of the sleeve. Between the inclined edges of the sleeve there is a wedge 40 which, when moved toward the left, expands the sleeve 39 causing it to grip the internal surface of hub 7 with a braking action. The spool 38 at its right end has a shoulder 41 adapted to engage the large end of wedge 40. When the brake is to be applied the spool is caused to move toward the left, thereby forcing the wedge 40 in the same direction. On its right hand extremity the spool is provided with small teeth 42 which are adapted to engage similar teeth 43 on a clutch nut 44 into which the driver screw 3 is threaded. When the driver screw is revolved in an anti-clockwise direction nut 44 is shifted toward the left, teeth 43 and 42 engage to prevent the nut from turning, and its bodily movement is transmitted to spool 38 and wedge 40 for setting the brake. On the other hand, when driver screw 3 is revolved in a clockwise direction nut 44 moves toward the right until its outer conical surface engages a similar internal conical surface 45 on the hub, whereby the sleeve 2 is frictionally attached to the hub, causing further clockwise movement of the sleeve and worm to turn the hub and the wheel in a forward direction. When the rider desires to coast the sleeve 2 is held still, whereupon the nut 44 backs off slightly to free it from frictional engagement with the hub, leaving the latter to turn freely around its bearings 6 and 30. In order to prevent the nut 44 from turning with the driver screw 3 when that element is turned in one direction or the other, a spring band 50 is carried by the spool 38 and is provided with spring fingers 51 which resiliently engage the periphery of nut 44 and restrain it from turning, so that it may be moved longitudinally of the axle by the driver screw.

When low speed is desired the rod 25 is turned so as to move the shifter element 17 into frictional engagement with brake element 16. In such position pins 27 are retracted from the sprocket but hold the flange 11 against rotation. The power being imparted to the sprocket from the driving chain (not shown) is then transmitted to the sleeve 2 and driver screw 3 at a reduced speed through the pinions 9 by reason of the planetary gear arrangement.

To obtain the direct drive or high speed connection the shifter fork 22 is turned by means of rod 25 so that member 17 moves away from brake member 16 and pins 27 enter sockets 29, thereby locking flange 11 and the sprocket together. With the parts in such position, pinions 9 become inoperative and the power applied to the sprocket from the chain is transmitted directly to the sleeve and driver screw.

Figure 5:
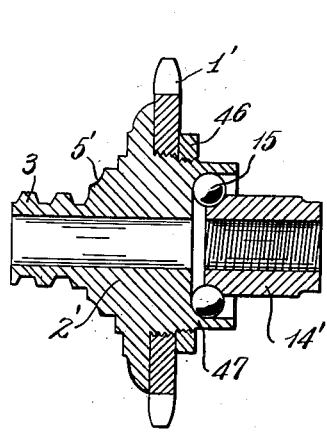
Fig. 5 is a sectional view of a single speed drive unit, the section being taken on a plane through the axis of the unit.
Figure 6:
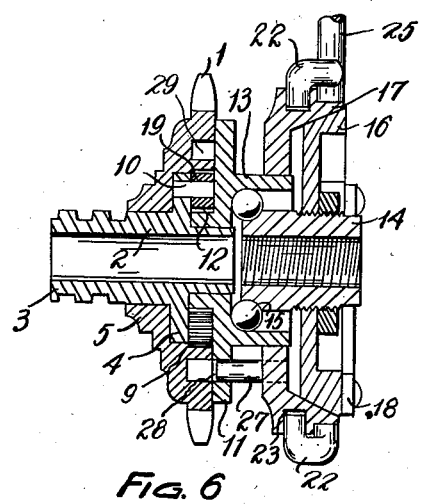
Fig. 6 is a similar view showing the corresponding two-speed unit which is interchangeable with the unit of Fig. 5.
Figure 4:
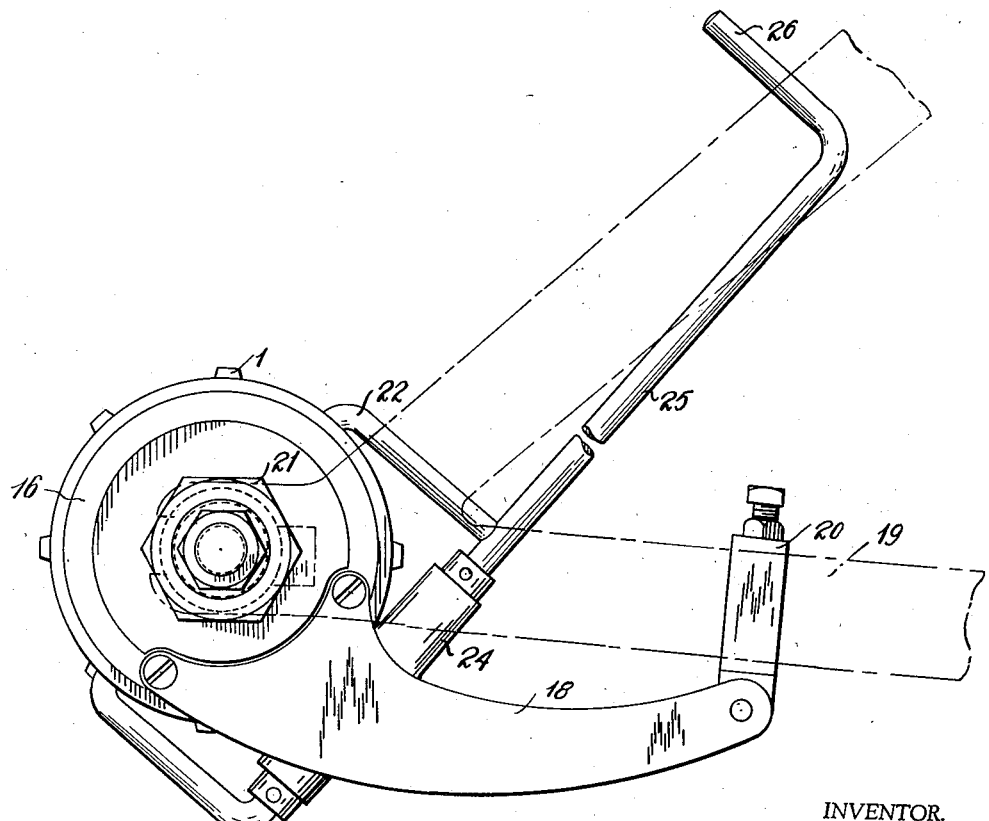
Fig. 4 is a side elevational view illustrating a shift mechanism which may be employed in connection with the invention.

Fig. 5 illustrates a single speed drive unit which conventionally forms a part of the coaster brake and which is interchangeable with the two-speed unit illustrated in Fig. 6. It comprises a sleeve 2' on the inner end of which is formed the driver screw 3, identical in shape and size with the screw 3 on the two-speed unit. The sleeve 2' is built to turn upon the shaft 34 and is adapted to be slid onto the shaft from the right hand end thereof just as is the sleeve 2 of the two-speed unit. Sleeve 2' is also provided with a ball race 5' formed and positioned exactly as is the similar race 5 of the two-speed unit. The sprocket I' is built as a ring and threaded onto a shouldered part of the sleeve 2', and a nut 46 is threaded up against sprocket ring I' to lock it in place. The outer end of the sleeve 2' is hollowed out concentrically to form a cup or race 47 for the ball bearing 15 and an internally threaded cone or spindle bearing 14' cooperates with the ball bearing 15 in the same manner as the similar part 14 in the two-speed unit. There is in fact no difference between the parts 14 and 14' except that 14' has no outer threads, none being needed with the single speed unit. However, if desired, the part 14 may be made to serve for both units.

As far as the operation and functioning of the coaster brake are concerned, they are precisely the same whether the simple sprocket and drive screw unit of Fig. 5 is employed or the two-speed unit of Fig. 6. When the conventional single speed unit is employed clutch nut 44 is shifted to the right by clockwise movement of sprocket I' and the driver screw 3 to which it is made fast. Nut 44 is shifted to the left by anti-clockwise movement of sprocket I'. Now, when my two-speed unit is employed and the flange 11 is locked to sprocket 1 by pins 27, as in Fig. 1, the parts 1, 11 and 12 all rotate together, and the action with respect to the driver screw is precisely the same as in the case of the conventional one speed sprocket and driver screw unit.

When pins 27 are shifted to the right the flange 11 is held stationary, rotation of sprocket 1 clockwise operates to turn sleeve 2 in the same direction but merely more slowly, and the driver screw 3 functions in the usual manner to transmit power to hub 7. Also, when sprocket 1 is rotated anti-clockwise, sleeve 2 is rotated in the same direction more slowly and hence the driver screw acts to set the brake just as though it were directly connected with the sprocket. Furthermore, when the sprocket is held stationary the sleeve 2 is held stationary also, because pinions 9 are then locked against movement. Hence the nut 44 is free to move out of engagement with the conical surface 45 and the hub turns freely, enabling the rider to coast while the pedals remain stationary.

When the direct drive is employed the driving ratio (between the rear sprocket and the pedal sprocket wheel) may be approximately four-to-one, whereas the geared drive may then provide a ratio of approximately two and three-fourths to one.

It will be observed that when the parts 16 and 21 are removed from the spindle bearing 14 and that bearing threaded off the shaft the complete two-speed unit comprising the sun gear 12, the sprocket wheel 1 with its internal gear, and the planet carrier with the driver screw 3 may be slid off the shaft, after which a single speed unit carrying a similar driver screw 3 may be inserted in its place, without in any way affecting the operation of the coaster brake with which it is used.

In accordance with the illustrated embodiment, when the double and single speed units are interchanged, one for the other, the axle 34 is not disturbed. However, in the broader aspects of the invention, each of these units may have its own axle, it being necessary in that event to remove nut 33, washer 32, and adjusting cone 31 before the conversion is made.

Having thus described my invention, I claim:

1. In a transmission for a bicycle having a rear axle, a coaster brake adapted to be mounted upon the axle, said coaster brake embodying a driver screw adapted to have a rotative bearing upon the axle, a planetary transmission comprising three principal elements, namely an internal gear, a planet carrier and a sun gear, a sprocket wheel rigid with said internal gear, planet gears on said planet carrier, said driver screw being rigid with said planet carrier, said sun gear having a radial flange, and means for locking said flange to one of the other two planetary transmission elements, all of said planetary transmission elements being adapted to be removed by the withdrawal of said driver screw from said axle, whereupon a conventional single speed transmission unit with its driver screw may be inserted in place of the two-speed unit.

2. In a transmission for a bicycle having a rear axle, a coaster brake adapted to be mounted upon the axle, said coaster brake embodying a driver screw adapted to have a rotative bearing upon the axle, a planetary transmission comprising three principal elements, namely an internal gear, a planet carrier and a sun gear, a sprocket wheel rigid with said internal gear, planet gears on said planet carrier, said driver screw being rigid with said planet carrier, said sun gear having a radial flange, a non-rotatable member arranged adjacent said flange, and means for locking said flange to said non-rotating member to hold said sun gear stationary, all of said planetary gear elements being adapted to be removed by the withdrawal of said driver screw from said axle.

3. In a coaster brake for bicycles, a conversion transmission unit comprising a sprocket wheel, an internal gear rigid therewith, a planet carrier, a coaster brake driver screw rigid with the planet carrier, a sun gear having a cylindrical flange projecting laterally from the free side of the transmission unit, and means comprising a collar slidable on said cylindrical flange for locking the elements of the planetary gearing together for one speed or for locking the sun gear against rotation for another speed.

4. In a coaster brake for bicycles, a conversion transmission unit comprising a sprocket wheel, an internal gear rigid therewith, a planet carrier, a coaster brake driver screw rigid with the planet carrier, a sun gear having a cylindrical flange projecting laterally from the free side of the transmission unit, a ball race within said cylindrical flange, bearing balls for said race and an adjusting cone for engagement with said balls, and means comprising a collar slidable on the outer side of said cylindrical flange for locking the elements of the planetary gearing together or for locking the sun gear against rotation.

5. In a coaster brake for a bicycle having a rear axle, a hub, braking mechanism therein, a clutch nut within the hub for engagement alternately with the braking mechanism and the hub, a driver screw cooperating with said nut surrounding said axle and having its bearing directly thereupon, planetary gearing comprising an internal gear element and a planet carrier element, one of said elements having a sprocket wheel thereon and the other element being carried by said driver screw, said planetary gearing comprising also a sun gear held against axial movement with respect to the other elements of the planetary gearing, and manually operable means for locking said sun gear against rotation.

BERT LEE.